United States Patent [19]

Gourneau et al.

[11] Patent Number: 4,675,807
[45] Date of Patent: Jun. 23, 1987

[54] MULTIPLE FILE TRANSFER TO STREAMING DEVICE

[75] Inventors: Dwight A. Gourneau; Steven W. Kerchberger, both of Rochester, Minn.

[73] Assignee: International Business Machines Corporation, Armonk, N.Y.

[21] Appl. No.: 608,656

[22] Filed: May 9, 1984

[51] Int. Cl.⁴ ............................................. G06F 15/00
[52] U.S. Cl. ..................................................... 364/200
[58] Field of Search ................................ 364/200, 900

[56] References Cited

U.S. PATENT DOCUMENTS

| | | | |
|---|---|---|---|
| 3,587,058 | 6/1971 | Butler et al. | 364/200 |
| 3,737,861 | 6/1973 | O'Neill et al. | 364/200 |
| 3,772,657 | 11/1973 | Marsalka et al. | 364/200 |
| 3,990,055 | 2/1976 | Henderson et al. | 364/200 |
| 4,084,231 | 4/1978 | Capozzi et al. | 364/200 |
| 4,100,601 | 7/1978 | Kaufman et al. | 364/200 |
| 4,410,942 | 10/1983 | Milligan et al. | 364/200 |

OTHER PUBLICATIONS

Baumer et al, IBM Tech. Dis. Bull.-vol. 17, No. 9, 2/75, "Interleaved Data Transfers".
Brown et al, IBM Tech. Dis. Bull.-V. 125, No. 4, 9/82, "Multi-Device Channel Operation".
"Batalden", IBM Tech. Dis. Bull.-vol. 26, No. 3B, 8/83, File Subsystem Architecture.

Primary Examiner—Felix D. Gruber
Assistant Examiner—John G. Mills
Attorney, Agent, or Firm—Hugh D. Jaeger

[57] ABSTRACT

Multiple file transfers to and from a streaming tape device all performing one operation on a first file, and while simultaneously performing another, different operation on a second file. Streaming is maintained on multiple file transfers and the ability to save files by name, while maintaining streaming mode across file boundaries. This is accomplished by pre-processing the next files characteristics, while outputting a present file. Three data paths are utilized between a central processing unit, a file subsystem processor, and I/O devices.

10 Claims, 9 Drawing Figures

MULTIPLE FILE TRANSFER TO STREAMING DEVICE

TECHNICAL FIELD

The invention relates to hardware and microcode for backing up or transferring non-contiguous multiple disk files to and from a streaming tape drive. The invention also relates to an I/O device control system for controlling I/O devices during I/O device to I/O device data transfers.

BACKGROUND ART

Computer systems include both disk storage devices and tape storage devices. The tape device is used for highspeed, high-volume, saving and restoring of the data files of the computer users. The disk drives are used as on-line storage for operating systems, application programs, user data files, and other processing information. A streaming tape device is a low cost, medium performance tape drive where the tape is transported directly from reel to reel with tension and velocity electronically controlled. Streaming tape drives have two modes of operation; the first mode being a start/stop and the second mode being a streaming mode. Because of the high inertia of the reels, the tape must be driven in start/stop mode in order to stop the tape in the interblock gap. The streaming mode is maintained by insuring that the tape drive commands and data (labels and data blocks) are available to the tape drive when required. The penalty for not reinstructing the tape drive in the required gap time, is that hitch back (tape respositioning) will occur. This is a very time consuming operation, and the streaming mode throughput will be adversely affected. In the streaming mode (100 inches per second in one example), the tape is moving past the read/write head at a much higher rate of speed. At this speed the tape cannot be stopped in the interblock gap because of the high inertia of the reels. After a data block has been written (or read) in a streaming mode, the tape drive assumes the next command and the data will be available while the interblock gap moves past the read/write head. Streaming mode is maintained by insuring that tape drive commands and data (labels and data blocks) are available to the tape drive head when required.

A computer user periodically saves the disk files for many purposes. In the example where the data on-line is lost, such as due to a machine malfunction or catastrophe, the data files from the last save operation can be restored. Typically, the data files are saved daily. To optimize the save function, the user needs the flexibility of saving data by file name (selective save). This minimizes the amount of output media required and reduces the time required to perform the function. This technique has a processing burden since it must locate the individual files and extract the file characteristics, physical location, length, content, etc. (prior to outputting the file). This processing commonly contributes to an increasingly significant overhead, as the average file size decreases and adversely effects the ability to keep a tape device streaming across file boundaries. An approach commonly used to save data files is to do an image dump where the entire contents of the disk drive is saved. This approach removes the processing burden, but requires more output media, a longer duration to perform a dump, and does not provide the flexibility of saving selected files.

The present invention provides a tape device to operate in a streaming mode across file boundaries by preprocessing the next file characteristics while outputting a present file. This is accomplished without requiring the system to be in a dedicated mode. The present invention also supports high speed file transfer from device to device, and particularly, transfers from disk to tape by insuring that the commands and data required are available for reinstructing a streaming tape device.

DISCLOSURE OF THE INVENTION

The general purpose of the present invention resides in hardware and microcode for transferring multiple disk files to and from a streaming tape device. A streaming tape device can be utilized at full efficiency by transferring selected non-contiguous data files in a channel processor without higher level intervention, and a time shorter than the record of the streaming device, queuing up and buffering the data of the file in the channel processor itself, and performing one operation on a first file while simultaneously performing another, different operation to a second file.

According to one embodiment of the present invention, there is provided a central processing unit connected to storage and a channel which connects to a file subsystem processor, which executes commands of the CPU, and which are for operation of I/O devices such as disk drives and tape drives. Device adapters and buffer file adapters connect I/O devices to the file subsystem processor. Data paths are provided between the CPU, the file subsystem processor, and the I/O devices for the transfer of data. Upon the file subsystem processor executing a command from the CPU, the command and parameters are placed into the CPU storage, the CPU then issues a command to the file subsystem processor for transferring the command from the CPU storage to the file subsystem processor storage and upon the file subsystem processor receiving the command from the CPU, a interrupt is generated for activating a microcode routine for retrieving the I/O command from the CPU storage and transferring the command to the file subsystem processor storage.

One significant aspect and feature of the present invention is that the tape device streams across all data files being outputted to the tape and improves the throughput by reducing the interfile processing time. The tape device is kept streaming and only the label overhead per file contributes to the throughput reduction as the file decreases.

Another significant aspect and feature of the present invention is a single control block which describes the transfer of a logical file.

A further significant aspect and feature of the present invention is a control function which executes in time to reinstruct a streaming tape file while the control function uses two data buffers to maximize data throughput. A file subsystem processor handles the control functions. Actual transfer of data takes place without interference to the system channel.

DESCRIPTION OF THE INVENTION

Figure 1:
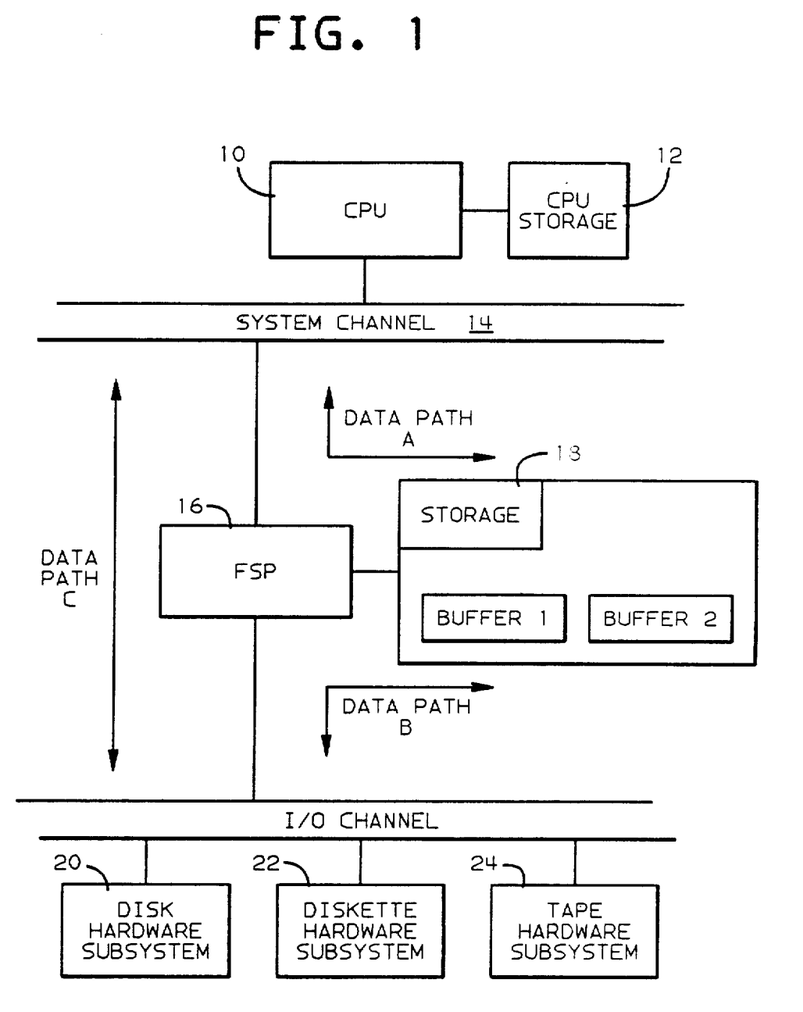
FIG. 1 is a schematic block diagram of a computer system incorporating the present invention, including the file subsystem processor architecture.

FIG. 1 illustrates the invention of a computer system including a central processing unit (CPU) 10 which connects to CPU storage 12 and system channel 14. The channel 14 connects to a File Subsystem Processor (FSP) 16. A FSP storage 18 connects to the FSP. The FSP 16 executes commands directed to it by the CPU 10. The commands for the FSP are, for purposes of this invention, for the operation of I/O device such as disk drives 20 or diskette drives 22, and tape drive 24. The I/O devices are connected to the FSP by device adapters and buffer file adapters not illustrated.

Three data paths utilized in the architecture of the invention. Data path "A" is utilized so the CPU 10 and FSP 16 can share information. For example, commands residing in CPU storage 12 are transferred to the FSP 16 for execution over data path "A". Data path "B" is utilized to connect FSP storage 18 to the I/O devices 20-24. This allows I/O devices to transfer data into and out of FSP storage 18. The I/O devices 20-24 can transfer data directly to CPU storage 12 by using data path "C".

When the CPU 10 orders the FSP 16 to execute a command, it places the command and associated parameters into CPU storage 12. The CPU 10 then issues a simple command to the FSP 16 whereby the FSP 16 transfers the command from CPU storage 12 to FSP storage 18. The FSP 16 upon receiving the simple command from the CPU 10 generates an interrupt which, in this instance, activates a microcode routine for retrieving the I/O command from CPU storage 12 for transfer to FSP storage 18.

Input - The File Transfer Command

Figure 2:
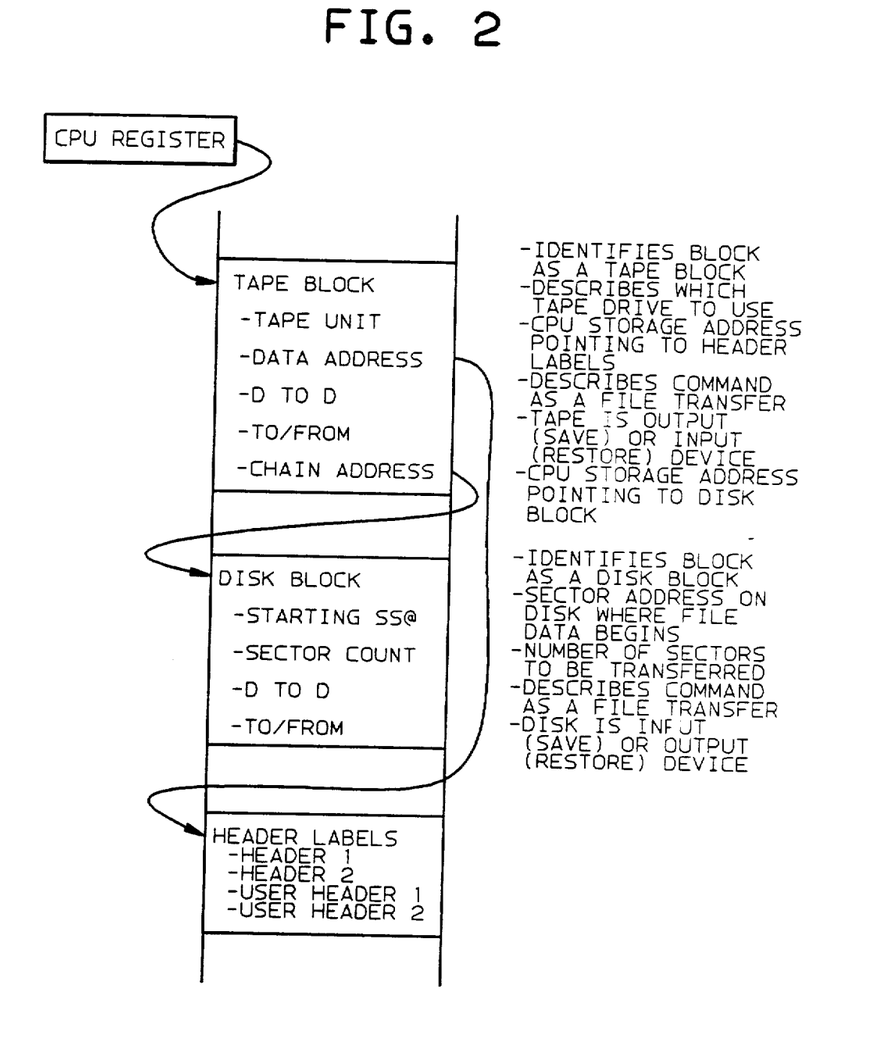
FIG. 2 is a diagram of an I/O command in CPU storage.

The I/O command in CPU storage 12 is built by a CPU code. Computer user keys in a command to save a file or a group of files and the various parameters to describe the file or files. The CPU code utilizes this information for building the I/O command. For example, when the I/O command is to save a disk file on tape, the I/O command is a tape block and a disk block where the disk block describes the disk file to be saved.

The I/O command is found in CPU storage 12 by a CPU register which contains a CPU storage address. The CPU register points to the I/O command.

FIG. 2 shows the I/O command and tape header labels. The tape block contains:

1. An indentifier describing the block as a tape block.
2. A CPU storage address where tape header labels are located.
3. A CPU storage address where the disk block is located.
4. Information to describe which tape drive is to be used.
5. Information indicating the tape block is part of a file transfer.
6. Indicator to specify tape as output (save) or input (restore) device.

The tape header labels describe the file on tape. The tape header labels also provide information necessary to restore the file to disk. In this example, four labels are built for each file. Each label is 80 bytes in length. The labels are: Header Label 1, Header Label 2, User Header Label 1, and User Header Label 2. The tape header label contain:

1. Dataset Identifier.
2. Dataset Sequence Number.
3. Dataset Serial Number.
4. Volume Sequence Number.
5. Information necessary to restore the file.
6. File name.
7. Record length for the file.
8. Number of records for the file.
9. Type of file (sequential, indexed, direct).

The disk block contains:

1. An identifier describing the block as a disk block.
2. Disk sector address where the file begins.
3. Number of sequential disk sectors to be transferred.
4. Information to describe the disk block as part of a file transfer.
5. Indicator to specify disk as input (save) or output (restore) device.

When the I/O command is transferred from CPU storage 12 to FSP storage 18, only the tape block and the disk block are transferred. The tape header labels are transferred from CPU storage 12 to FSP storage 18 when the Device to Device code makes the request.

CPU Processing

Figure 3:
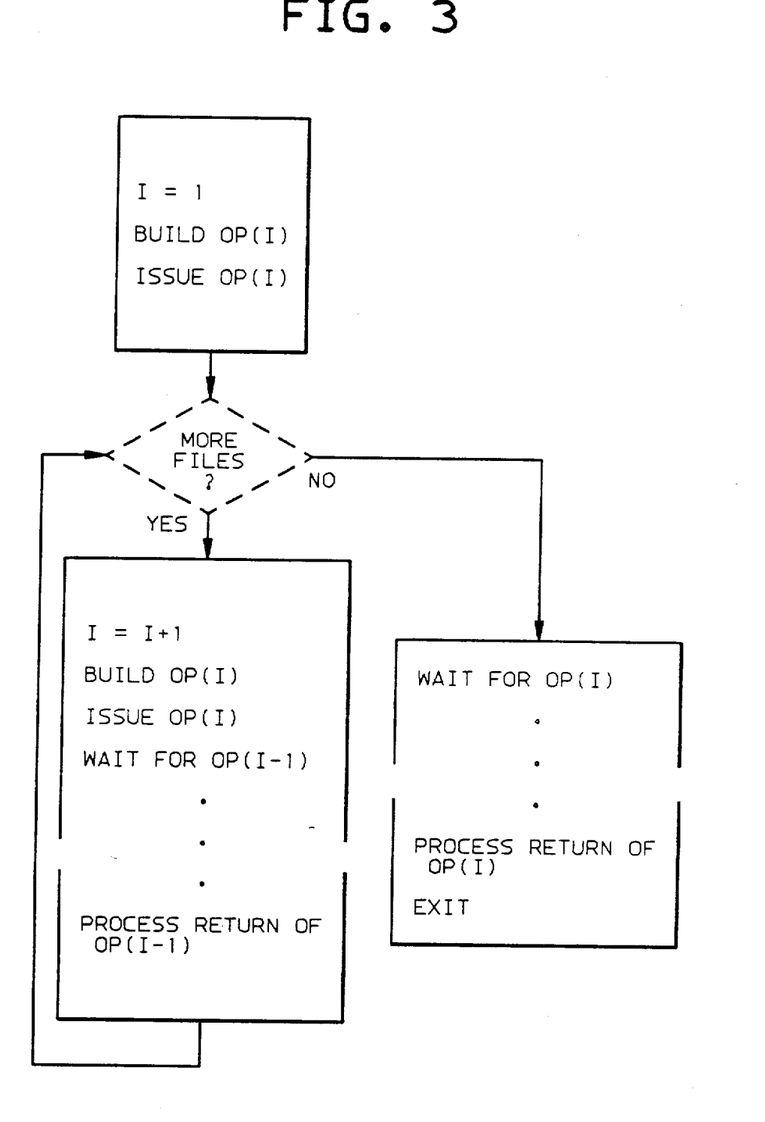
FIG. 3 is a flow chart of CPU program command flow.

FIG. 3 illustrates CPU program flow for a Save function. The CPU program converts information keyed in by the user into a series of I/O commands. These I/O commands describe the file transfer(s) requested by the user. The CPU program builds an I/O command with appropriate header labels for each file to be saved. The CPU program is able to perform the save function on multiple selectable files.

The CPU program processes the input for the first file to be saved. The I/O command is built and the command is issued to the FSP 16 while traditionally CPU programs would wait at this point for the I/O command to complete the requirements for streaming tape; however, dictate that the CPU program must continue at this point and process the second file to be saved. If no more files are to be saved, the CPU program waits for the outstanding I/O command. When this command completes, the CPU program finishes processing for the file and terminates. During the wait, the CPU program is in a wait state. If another program is in a ready state, the CPU will give the ready program control. If there are more files to be saved, the CPU program processes the input to the next file, builds the I/O command the issues the I/O command to the FSP 16. The CPU program waits for the previous I/O command to complete. When this command completes, the CPU program finishes processing for the file. Next, the CPU program checks to see if there are more files to be saved. If the CPU program waits for each I/O command to complete without processing the next file, the tape device would not be able to stream between files. The time necessary for the I/O command to flow back to the CPU 10 and be processed plus the time required by the CPU program to build the I/O command for the next file would far exceed the streaming tape device reinstruct time of the time from the termination of the last read or write block command on tape hardware until the tape hardware requires another read or write block command. The CPU program includes file processing. This involves CPU code locking the file from use by others while the file is being saved and freeing the file when the save is finished.

Device to Device Processing

After the device to device code is invoked by an action controller, later as described in FIG. 4, processing of the file transfer command can begin. Device to Device processing is divided into three phases as now set forth.
1. Preprocessing.
2. Data Transfer.
3. Termination.

Preprocessing Phase

During the preprocessing phase, the following functions are performed by the device to device code.
1. Audit the tape block and disk block for valid transfer.
2. Check to see if device to device code is already processing a transfer.
3. Initialized tape blocks and disk blocks to be used to transfer the file.
4. Transfer tape header labels from CPU storage to FSP storage.
5. Initialized file control block for file to be transferred.

Data Transfer Phase

During the data transfer phase of processing, the device to device code controls the transfer of physical data from one I/O device to another. The tape blocks and disk blocks issued to the tape control code and the disk control code respectively complete, and control is returned to the device to device code. Information in the block indicates to the device to device code which file control block the command was issued for, and which buffer the command was using. While the command(s) are being processed by the respective control code, the device to device code is idle. The FSP 16 is looping in the action controller code.

In initiating the data transfer phase, the device to device code issues two disk commands to fill each buffer in FSP storage 18. The completion of the first disk command orders the device to device code that the first buffer of data is ready to be written to tape. Before the data can be written however, header labels must be written to tape. After preprocessing, the tape header labels are in FSP storage 18. After completion of the first disk command, the device to device code issues a tape block to the tape control code. The tape block describes a write header label command. Then the device to device code issues another tape block to the tape control code. This tape block describes a write tape block command.

After the device to device code has decoded the command, the next step in processing is determined. If the command that just completed filled one of the FSP buffers with data, the device to device code issues the command to empty the buffer to the proper I/O device. If the command empties one of the FSP buffers, the device to device code can use this buffer for input. If there is more data to transfer, the device to device code issues the command to fill the buffer with more data. Otherwise, control is passed to the termination phase.

Termination Phase

During the termination phase, the device to device code must cleanly terminate the file being processed. In addition, the device to device code must start the data transfer phase of the next file if one has been preprocessed.

For files to be written to tape in a Label format, the data, on tape, must be preceded by header labels and end with trailer labels. The tape control code generates the trailer labels from the header labels and the number of tape blocks written. The tape trailer labels are written to tape with the close command. During the termination phase, the device to device code sets up a tape block for a close command and issues the tape block to the tape control code.

Termination of the file transfer cannot complete until the close command returns. However, the device to device code does not have to be idle while waiting for the close command to complete. If a second file transfer command has been preprocessed, the device to device code issues the write header labels command for the next file. Since the tape control code processed command sequentially, the write header labels command cannot be processed until the close command for the previous file has completed. Also, since the file in the termination phase has no further use for the buffers in FSP storage 18, the device to device code issues disk commands to fill the buffers.

The Action Controller

Figure 4:
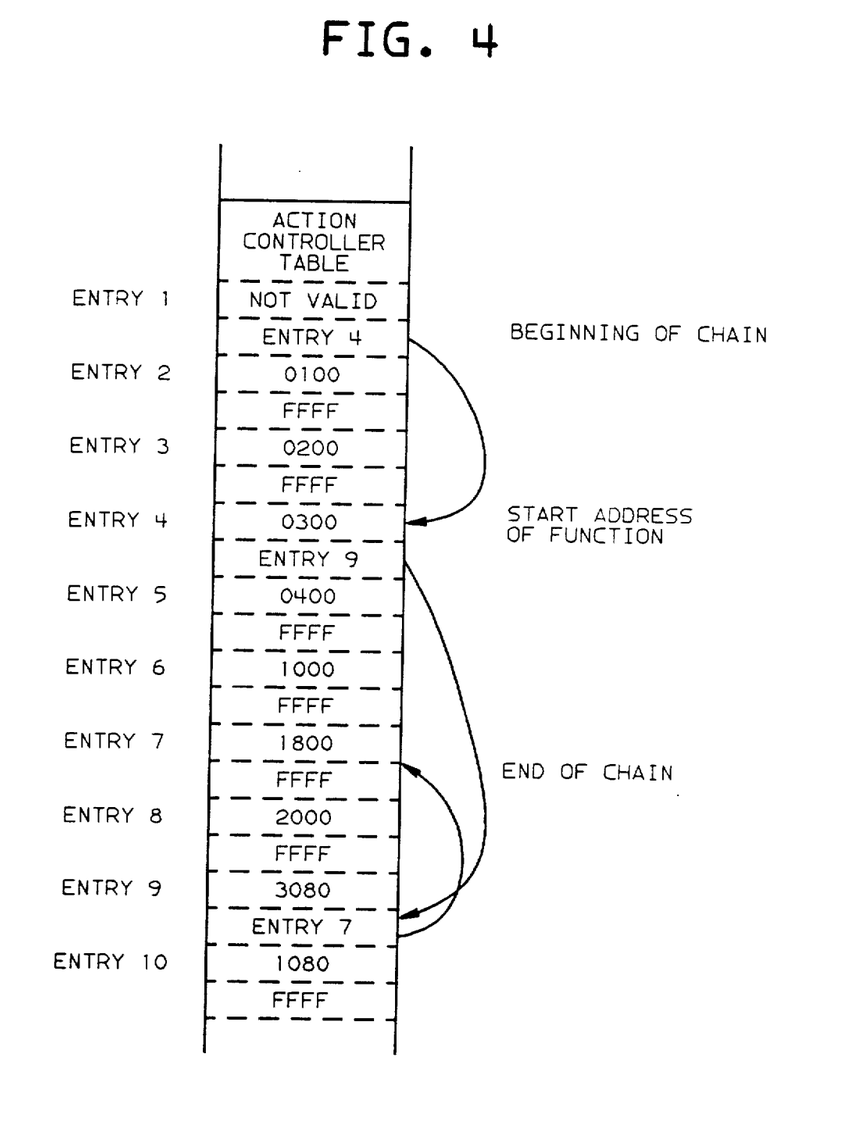
FIG. 4 is an example of an action controller table.

FIG. 4 illustrates an action controller table in FSP storage 18. The action controller is resident code that executes in the FSP 16. When the FSP 16 is not busy, the action controller is looping. The action controller functions by examining the action controller table. Each entry in the action controller table is 2 words (4 bytes) in length. The first word of each entry is the FSP address where the code for the entry's function begins. The second word of each entry is a link field. The link field contains an FSP address pointing to the next active entry in the action controller table. If the link field is x'FFFF', then this is the last active entry in the action controller table.

Since more than one entry in the action controller tables can be active at a given time, the action controller table must be prioritized. The entries in the action controller table are sequentially in order from highest priority to lowest.

The first entry in the action controller table contains only a link field. The link field is either x'FFFF' indicating nothing to do or a link to the action controller table entry with highest priority.

When the first entry in the action controller table has x'FFFF' in the link field, the action controller code will continue to loop by examining the first entry in the action controller table over and over. When the FSP 16 has processing, an interrupt causes the action controller code to temporarily stop. The interrupt code handles the interrupt condition then calls a subroutine to request a particular FSP service. The FSP service being requested is identified in the input to the subroutine. The subroutine will set the first word in the action controller table to point to the entry in the action controller table for the service being requested.

Tape Control Code

The tape control code executes tape command sequentially. The tape control code uses a command queue to insure commands are executed sequentially. The tape command code translates tape blocks into control blocks where the control blocks are used to carry out the command. The tape control code interfaces with the tape hardware. When the tape command has completed, the tape control code puts completion status in the tape block and posts the command complete.

Disk Control Code

The disk control code does not execute disk command sequentially, but disk commands are executed depending on the physical position of disk mechanical elements. This means multiple disk commands can complete in any order, regardless of the order in which the commands were issued. The device to device code synchronizes disk commands to keep the data in the correct sequence. The disk command code translates disk blocks into control blocks where the control blocks are used to carry out the command. The disk control code interfaces with the disk hardware. When the disk command has completed, the disk control code puts completion status in the disk block and posts the command complete.

Mode of Operation - an Example Flow

FIGS. 5-9 illustrate operation of the invention which illustrate the operation of the main program level, the channel interrupt level, and the device interrupt level with respect to time.

Figure 5:
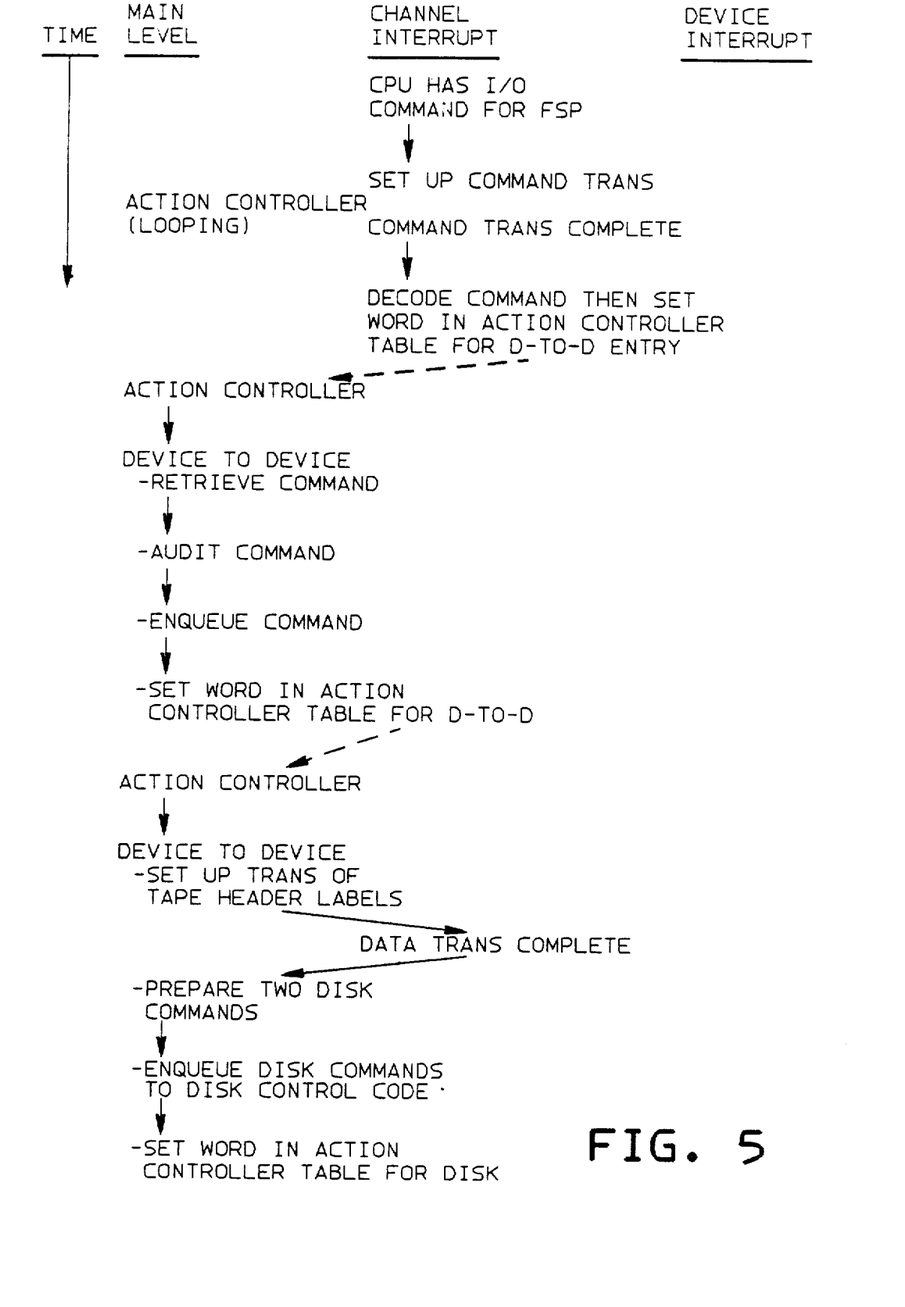
FIGS. 5-9 illustrates a file subsystem processor program flow for operation of main program level, channel interrupt level, and device interrupt level with respect to time.

FIG. 5 illustrates that the entire operation is initiated with a command transfer command from the CPU 10 where the command is transferred to FSP storage 18. Until a code is invoked, the action controller loops on the main program level. When the command transfer is complete, the command is decoded enough to know the command is a Device to Device operation. The Device to Device entry is set in the action controller table, and the channel interrupt level is exited. The action controller scans the action controller table and determines that the Device to Device code should be invoked. The Device to Device code is given control and the code retrieves the command. The I/O command is audited and then placed on the Device to Device queue. The Device to Device code then sets the action controller entry for Device to Device processing. The action controller scans the action controller table and determines that the Device to Device processing code sould be invoked. The Device to Device processing code is given control and the tape header labels are transferred from CPU storage 12 to FSP storage 18. Since the Device to Device code is not processing another transfer, the FSP buffers can be used to transfer data. The Device to Device code prepares two disk commands. The first disk command reads the first block of data from disk into FSP buffer A. The second disk command reads the next block of data from disk into FSP buffer B. The disk commands are placed on the disk queue, and the entry for disk code is set in the action controller table. If there is a higher priority FSP service marked in the action controller table, then the action controller will give or pass control to that service.

Figure 6:
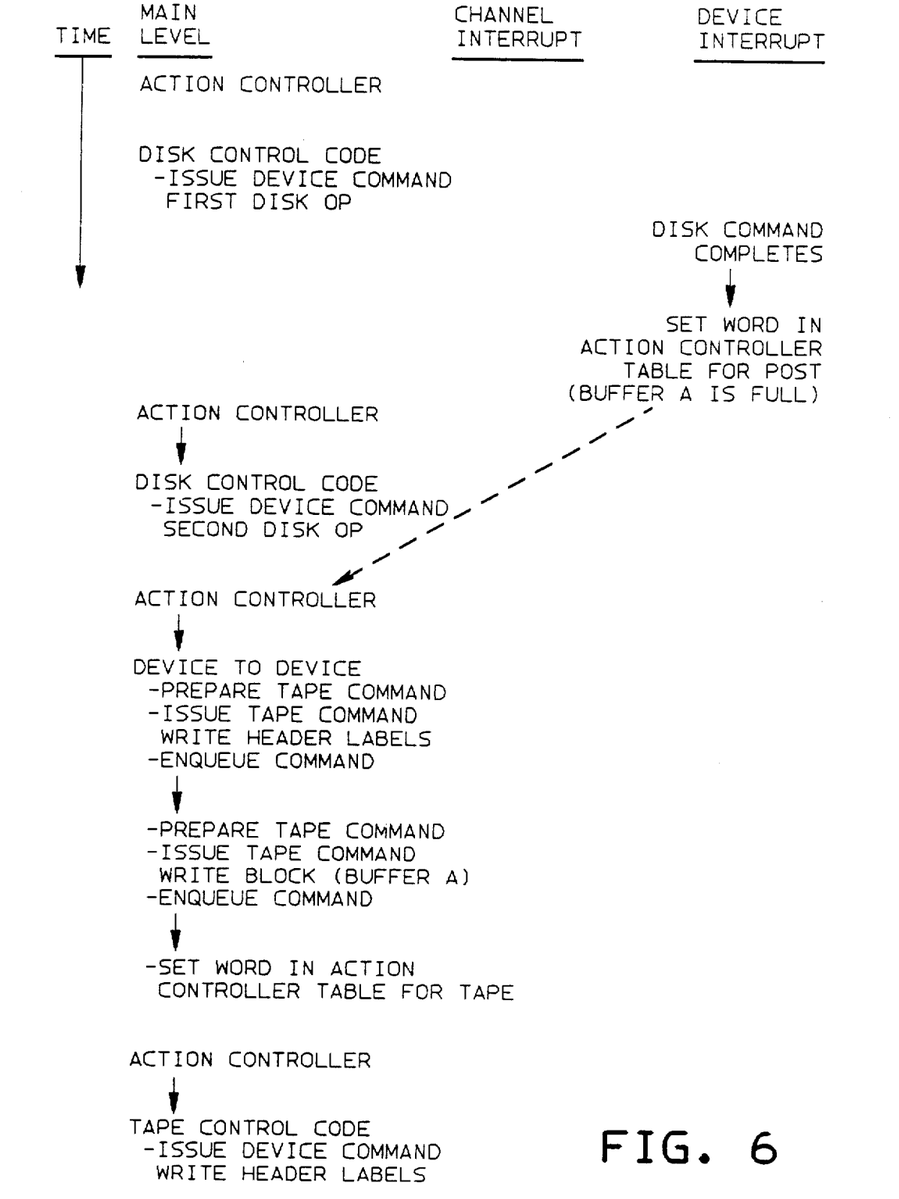

FIG. 6 illustrates when the action controller scans the action controller table and determines that the disk control code should be invoked. The disk control code sets up the hardware for the first disk command. When the disk command has completed, the disk hardware interrupts the FSP and the device interrupt level becomes active. The device interrupt code determines that a disk command has completed and sets the entry for post in the action controller table. The action controller scans the action controller table and determines that the disk control code should be invoked for the second disk command. The disk control code sets up the hardware for the second disk command. The action controller next determines that the post code should be invoked. The post code determines that the command came from the Device to Device code and control is given to the Device to Device code. The Device to Device code gets control, because the first disk command has completed. This means that FSP buffer A is full and should be copied to tape. First, however, the tape header labels must be written. The Device to Device code prepares the tape command to write header labels and places the command on the tape queue. Then, the Device to Device code prepares the tape command to write FSP buffer A and places this command on the tape queue. Next, the Device to Device code sets the entry for the tape control code in the action controller table.

Figure 7:
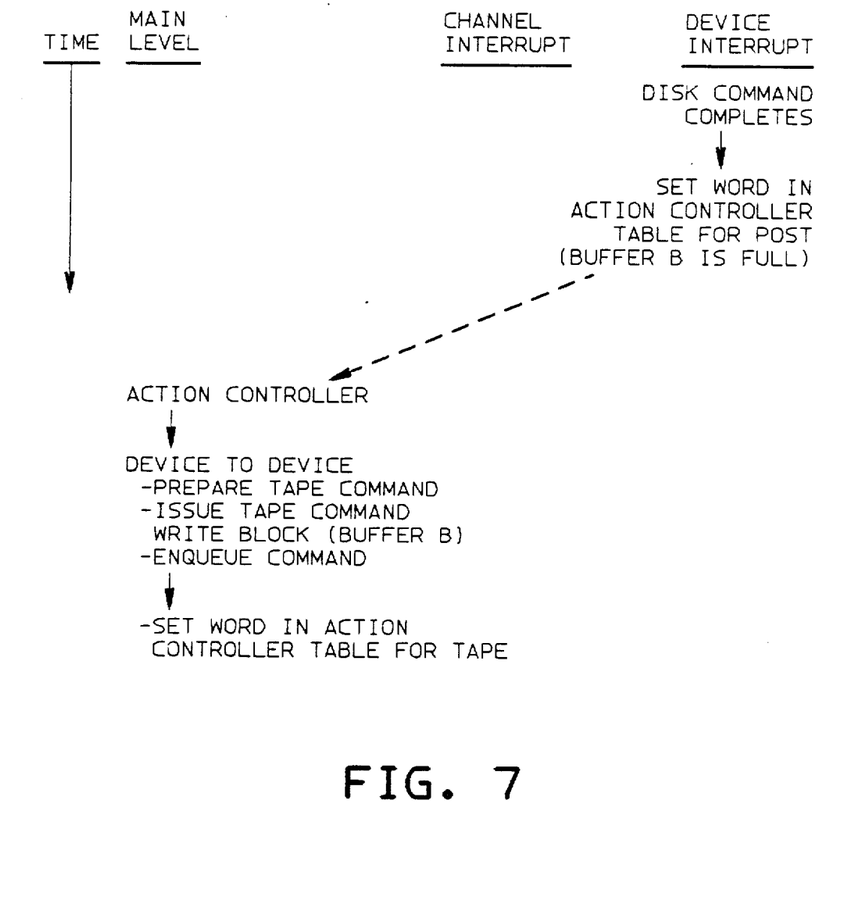

FIG. 7 illustrates the second disk command completed and the device interrupt code is invoked. The device interrupt code determines that a disk command has completed and sets the entry for post in the action controller table. The action controller next determines that the post code should be invoked. The post code determines that the command came from the Device to Device code and control is given to the Device to Device code. The Device to Device code prepares the tape command to write FSP buffer B and places the tape command on the tape queue. The Device to Device code sets the entry for tape control code in the action controller table.

Figure 8:
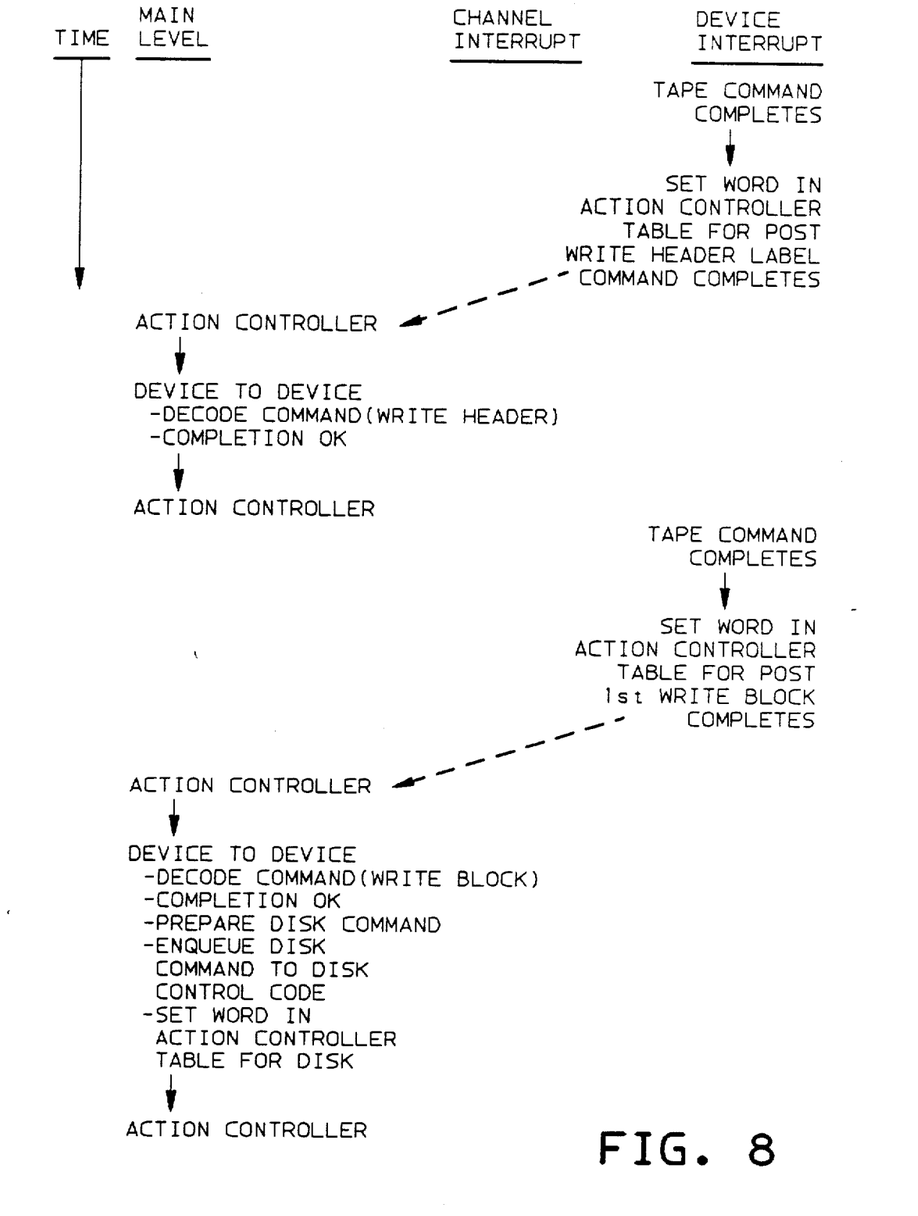

FIG. 8 illustrates the completion of the first two tape commands. When the tape write header label command has completed, the tape hardware interrupts the FSP and the device interrupt level becomes active. The device interrupt code determines that a tape command has completed and sets the entry for post in the action controller table. The action controller scans the action controller table and determines that the post code should be invoked. The post code determines that the command came from the Device to Device code and control is given to the Device to Device code. The Device to Device code decodes the returning command and finds such to be the write header label command. The Device to Device code checks the completion of the command and then returns control to the action controller. When the tape write block command has completed, the tape hardware interrupts the FSP and the device interrupt level becomes active. The device interrupt code determines that a tape command has completed and sets the entry for post in the action controller table. The action controller scans the action controller table and determines that the post code should be invoked. The post code determines that the command came from the Device to Device code, and control is given to the Device to Device code. The Device to Device code decodes the returning command and finds such to be a write block command. The Device to Device code checks for completion of the command to be sure such is OK. Then, the Device to Device code prepares a disk command to fill the FSP buffer just emptied by the tape write block command. The disk command is issued to the disk control code and the entry for disk control code and the entry for disk control code is set in the action controller table. Control is then passed to the action controller.

Figure 9:
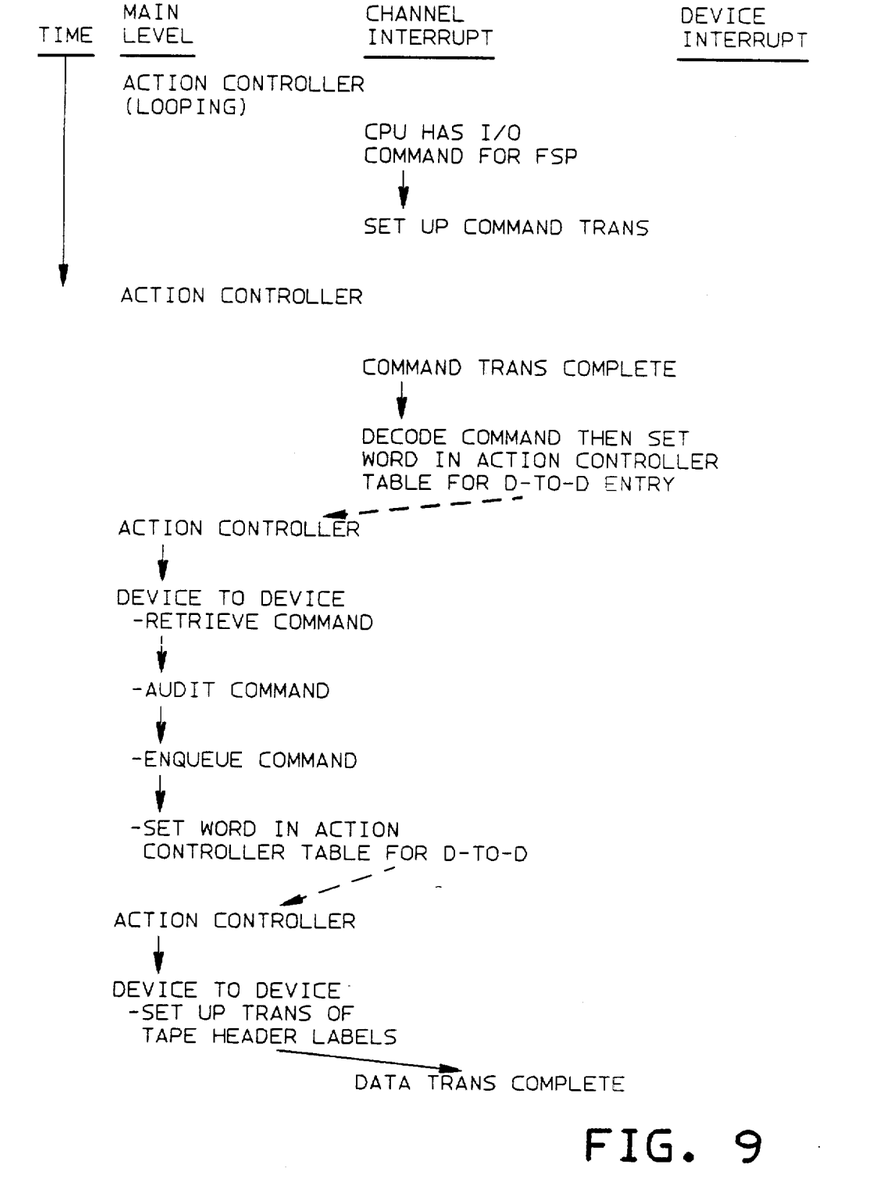

FIG. 9 illustrates the action controller looping while the Device to Device code is waiting for a command to complete. The CPU 10 then interrupts the main program level with another I/O command. The command is transferred to FSP storage 18 and the channel interrupt code determines that the I/O command is a Device to Device operation. The Device to Device entry is set in the action controller table and the channel interrupt level is exited. The action controller scans the action controller table and determines that the Device to Device code should be invoked. The Device to Device code is given control and the code retrieves the command. The I/O command is audited and then placed on the Device to Device queue. The Device to Device code then sets the action controller entry for Device to Device processing. The action controller scans the action controller table and determines that the Device to Device processing code should be invoked. The Device to Device processing code is given control and the tape header labels are transferred from CPU storage to FSP storage. Since the Device to Device code is processing another transfer, the FSP buffers are in use and further processing for this file transfer must be suspended until the FSP buffers become available.

We claim:

1. A computer consisting of a central processing unit with memory storage, system channels connected to a file system processor and storage buffers and I/O channel connected to disk, diskette, and tape drive hardware subsystems for backing up or transferring non-contiguous multiple file transfers to and from a streaming tape drive wherein a tape is transported directly from reel to reel of said streaming tape device with tension and velocity electronically controlled by said system comprising:
   a. identifying means in said central processing unit for selecting each of multiple selectable files for transfer from a first I/O device, by building an I/O command for transferring each of said files;
   b. issuing means in said central processing unit for synchronously passing each of said I/O commands over a system channel to said file subsystem processor from said central processing unit while said central processing unit continues to build I/O commands for each of said files;
   c. invoking means in said file subsystem processor for transferring each of said files including said I/O commands and data in each of said files over an I/O channel on receiving said I/O command to first and second streaming tape drives; and,
   d. data paths which maintain a streaming data mode between said CPU and said file subsystem processor, and between said first and second tape drives and said file subsystem processor.

2. System of claim 1 comprising means for saving a file transferred to a second I/O device in a label format.

3. System of claim 1 wherein said first I/O device is a disk file.

4. System of claim 2 wherein said second I/O device is a streaming tape device.

5. System of claim 4 comprising means for maintaining said streaming tape device across multiple file boundaries.

6. System of claim 1 including an action controller means for prioritizing I/O commands in said file subsystem processor.

7. System of claim 1 including coding means for restoring files to said first I/O device.

8. System of claim 1 comprising two data buffers in said file subsystem processor for maximizing data throughput.

9. Process for backing up or transferring non-contiguous multiple file transfers to and from a streaming tape drive comprising the steps of:
   a. identifying multiple selectable files for transfer from a first I/O device in a CPU;
   b. building an I/O command for transferring each of said files in said CPU;
   c. synchronously passing said I/O command over a system channel from said CPU to a file subsystem processor;
   d. continuously building I/O commands in said CPU and transferring said I/O commands over said system channel to said file subsystem processor said CPU continuing to build I/O commands for each of said files; and,
   e. invoking in said file subsystem processor of a file transfer to a second I/O device including said I/O command and data in each of said files over an I/O channel on receiving said I/O command to a second I/O device while said second I/O device is streaming.

10. Process of claim 9 wherein said second I/O device is a streaming tape device.

* * * * *